(12) United States Patent
Fillatreau et al.

(10) Patent No.: US 7,260,896 B2
(45) Date of Patent: Aug. 28, 2007

(54) ELECTRONIC COMPASS AND METHOD OF CALIBRATION

(75) Inventors: Philippe Fillatreau, Toulouse (FR); Francois-Xavier Bernard, Corronsac (FR)

(73) Assignee: Siemens VDO Automotive Corporation, Auburn Hills, MI (US)

( * ) Notice: Subject to any disclaimer, the term of this patent is extended or adjusted under 35 U.S.C. 154(b) by 119 days.

(21) Appl. No.: 11/101,283

(22) Filed: Apr. 7, 2005

(65) Prior Publication Data

US 2005/0223575 A1  Oct. 13, 2005

Related U.S. Application Data

(60) Provisional application No. 60/560,206, filed on Apr. 7, 2004.

(51) Int. Cl.
*G01C 17/38* (2006.01)
(52) U.S. Cl. .......................... 33/356; 73/1.76
(58) Field of Classification Search ............... 33/356, 33/357, 355 R; 701/224; 702/92, 93; 73/1.76, 73/1.78
See application file for complete search history.

(56) References Cited

U.S. PATENT DOCUMENTS

| | | | |
|---|---|---|---|
| 4,611,293 A | 9/1986 | Hatch et al. | |
| 5,046,031 A | 9/1991 | Wanous | |
| 5,737,226 A * | 4/1998 | Olson et al. | 701/224 |
| 5,862,517 A * | 1/1999 | Honey et al. | 702/85 |
| 6,014,610 A | 1/2000 | Judge et al. | |
| 6,253,154 B1 * | 6/2001 | Oshizawa et al. | 701/221 |
| 6,401,036 B1 * | 6/2002 | Geier et al. | 701/214 |
| 6,651,003 B2 * | 11/2003 | Woloszyk et al. | 701/224 |
| 6,871,411 B1 * | 3/2005 | Kang et al. | 33/356 |
| 2005/0223573 A1 * | 10/2005 | Fillatreau et al. | 33/356 |
| 2005/0228603 A1 * | 10/2005 | Fillatreau et al. | 702/92 |

FOREIGN PATENT DOCUMENTS

WO    WO 2004099715 A2 * 11/2004

* cited by examiner

*Primary Examiner*—R. Alexander Smith

(57) ABSTRACT

An electronic compass assembly includes a first collection portion and a second collection portion that each collect magnetic field data. The magnetic field data collected by the second collection portion partially overlaps the magnetic field data collected by the first collection portion. A processor module determines a calibration output based upon the magnetic field data from the first collection portion if a first predetermined condition exists and determines the calibration output based upon magnetic field data from the second collection portion if a second predetermined condition exists. An example method for controlling the electronic compass includes calibrating the electronic compass based upon one of a first magnetic field data set or a second, partially overlapping magnetic field data set. In another example, the processor module counts the number of magnetic field data points collected by one of the first magnetic field data set, the second magnetic field data set, or both, and determines a calibration output if the number exceeds a threshold. The processor module then uses acceptance criteria to determine whether to accept or reject the calibration output.

19 Claims, 3 Drawing Sheets

ELECTRONIC COMPASS AND METHOD OF CALIBRATION

BACKGROUND OF THE INVENTION

The application claims priority to U.S. Provisional Application No. 60/560,206, filed on Apr. 7, 2004.

This invention relates to a compass and, more particularly, to an electronic compass assembly and methods for controlling and calibrating an electronic compass assembly.

Electronic compass assemblies are often used in vehicles to indicate to a driver or passenger of the vehicle the direction that the vehicle is facing or traveling. A typical electronic compass assembly includes magnetic sensors that detect the magnetic field of the Earth. A microprocessor typically then calculates the direction of the vehicle from the detected magnetic field and displays the direction as one of North, South, East, West, Northeast, Northwest, Southeast, and Southwest.

Typical electronic compass assemblies are periodically calibrated to account for magnetic interference, drift in the magnetic sensors over time, and other factors that affect the accuracy of the calculated direction. The microprocessor requires magnetic field data through a 360° rotation (or a predetermined percentage of the 360° turn) of the vehicle to perform the calibration. Magnetic field data is collected and stored until the vehicle undergoes the full 360° rotation (or a predetermined percentage of the 360° turn).

Often, the vehicle travels for a considerable period of time and over a considerable distance before completing a 360° rotation (or a predetermined percentage of the 360° turn) and acquiring a sufficient set of magnetic field data to perform the calibration. Magnetic field data collected over long time periods or over long distances may skew the calibration. The microprocessor clears the stored magnetic field data if a timeout period is exceeded in order to assure that magnetic field data used for the calibration is reliable. Disadvantageously, the timeout period may occur just as the microprocessor is about to begin the calibration. Upon clearing the stored magnetic field data, the microprocessor begins collecting and storing all new magnetic field data without having performed the calibration. This may result in an extended period of time between calibrations and inaccurate calculation of the direction of the vehicle.

Accordingly, there is a need for an electronic compass assembly and method that reliably calibrates more often to provide more accurate calculations of vehicle directions. This invention addresses those needs and provides enhanced capabilities while avoiding the shortcomings and drawbacks of the prior art.

SUMMARY OF THE INVENTION

An example method for controlling an electronic compass includes calibrating the electronic compass based upon a first magnetic field data set if a first predetermined condition exists and calibrating the electronic compass based upon a second, overlapping magnetic field data set if a second predetermined condition exists.

An example method of calibrating the electronic compass includes collecting magnetic field data from a first magnetic field data set and collecting partially overlapping magnetic field data from a second magnetic field data set.

An example electronic compass assembly includes a first collection portion and a second collection portion that each collect magnetic field data. The magnetic field data collected by the second collection portion partially overlaps the magnetic field data collected by the first collection portion. A processor module determines a calibration output based upon the magnetic field data from the first collection portion if a first predetermined condition exists and determines the calibration output based upon magnetic field data from the second collection portion if a second predetermined condition exists.

In another example, the processor module counts the number of magnetic field data points collected for one of the first magnetic field data set, the second magnetic field data set, or both, and determines a calibration output if the number exceeds a threshold. The processor module then uses acceptance criteria to determine whether to accept or reject the calibration output.

BRIEF DESCRIPTION OF THE DRAWINGS

The various features and advantages of this invention will become apparent to those skilled in the art from the following detailed description of the currently preferred embodiment. The drawings that accompany the detailed description can be briefly described as follows.

DETAILED DESCRIPTION OF THE PREFERRED EMBODIMENT

Figure 1:
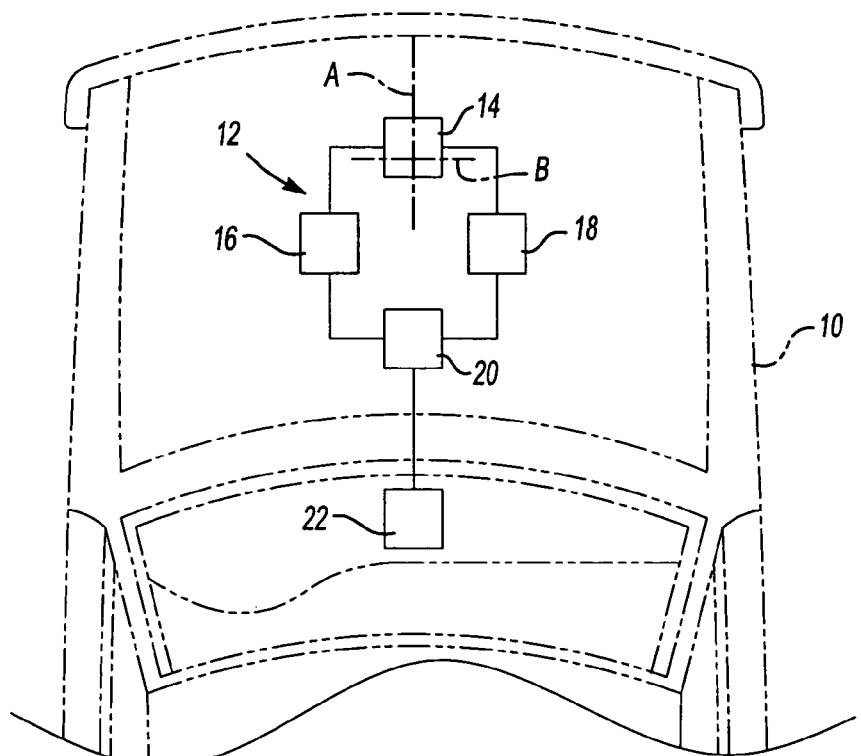
FIG. 1 is a schematic view of selected portions of an example vehicle having an electronic compass assembly.

FIG. 1 is a schematic view of an example vehicle 10 having an electronic compass assembly 12 for determining a direction the vehicle 10 is facing or traveling. It is to be understood that the illustrated size of the compass assembly 12 and location in the vehicle 10 are not necessarily accurate and may vary depending upon the needs of a particular application. In the example shown, the electronic compass assembly 12 includes magnetic sensors 14 that detect a magnetic field along a first longitudinal axis A and a second, transverse axis B. The magnetic sensors 14 communicate output signals representative of the magnetic field. A first collection portion 16 and a second collection portion 18 each receive the output signals and perform mathematical calculations based upon the output signals in expectation of a calibration calculation, for example. A processor module 20 determines a calibration output based upon magnetic field data from either the first collection portion 16 or the second collection portion 18. The processor module 20 uses the calibration output to determine compass headings and displays vehicle directions based upon the compass headings on a compass display portion 22 to a driver or passenger of the vehicle 10, for example.

In the illustrated example, the magnetic sensors 14, first collection portion 16, second collection portion 18, processor module 20, and compass display portion 22 are separate, however, given this description, one skilled in the art would recognize the value in combining one or more of these into a single integrated assembly to meet the needs of their particular situation.

Figure 2:
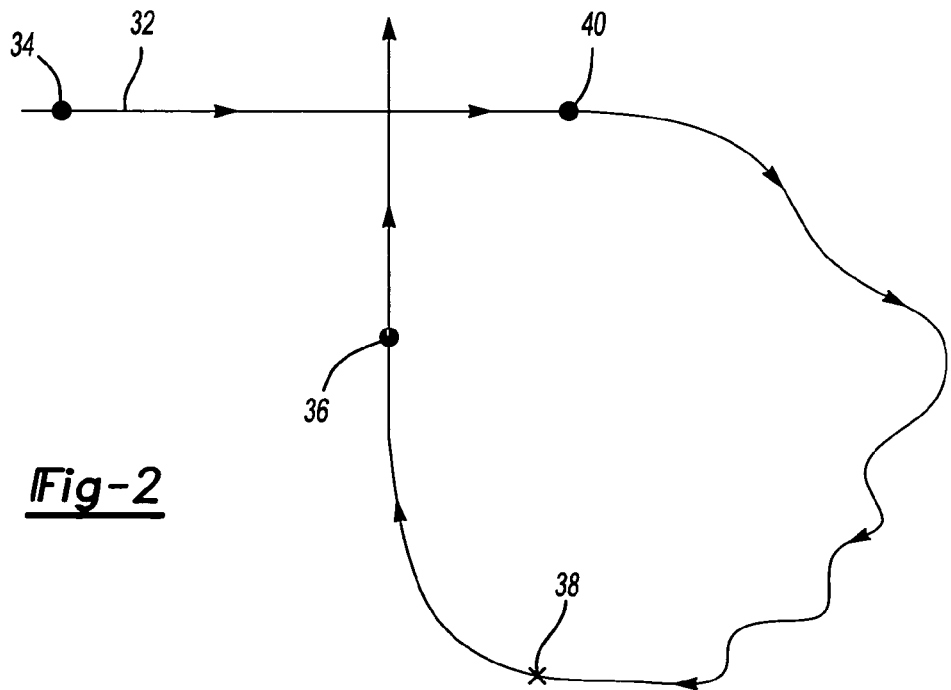
FIG. 2 schematically illustrates an example method of calibrating an electronic compass.

FIG. 2 schematically illustrates an example method of controlling and calibrating the electronic compass assembly 12. In this example, the vehicle 10 undergoes a 270° rotation traveling over the path 32 between the points 34 and 36. At 34, the processor module 20 commands the first collection portion 16 to begin collecting magnetic field data based upon output signals from the magnetic sensors 14. In the example shown, the processor module 20 requires magnetic field data through a 270° of rotation of the vehicle 10, for example, to perform the calibration. That is, the processor module 20 will not perform a calibration if the collected magnetic field data represents less than a 270° rotation.

The first collection module 16 continues to collect magnetic field data until the 270° of rotation is completed or a predetermined time limit is exceeded. An expected completion of the 270° rotation is represented at 36 and, in this example, the predetermined time limit occurs at 38 before the vehicle 10 reaches the point at 36. In one example, the predetermined time limit is programmed into the processor module 20. In another example, the predetermined time limit corresponds to a length of time beyond which the magnetic field data stored in the first module is unreliable (e.g., as determined by a designer of the electronic compass assembly).

The processor module 20 commands the second collection portion 18 to begin collecting magnetic field data at 40. In the illustrated example, the vehicle 10 has not yet rotated through any of the 270° required to perform a calibration. The time when the second storage portion 18 begins collecting the magnetic field data corresponds to the predetermined time limit. In one example, the time when the second collection portion 18 begins collecting the magnetic field data is a percentage (e.g., 50%) of the predetermined time limit.

The first collection portion 16 and the second collection portion 18 collect partially overlapping magnetic field data. Between the time when the second collection portion 18 begins collecting magnetic field data at 40 and the predetermined time limit at 38, duplicate magnetic field data is collected by the first collection portion 16 and the second collection portion 18.

In the illustrated example, the predetermined time limit at 38 occurs before the vehicle 10 completes the 270° rotation at 36. As a result, the processor module 20 purges the first collection portion 16 at 38 such that no magnetic field data or calibration computations based upon the magnetic field data are stored within the first storage portion 16. The second collection portion 18 continues to collect magnetic field data after the first collection portion 16 is purged, along with the duplicate magnetic field data already collected. This provides the benefit of preserving a potentially reliable portion of the magnetic field data (i.e. the duplicate magnetic field data) that was collected in the first collection portion 16 and discarding an older portion of the magnetic field data (i.e. data from before point 40).

The processor module 20 continuously tracks the rotation of the vehicle in a known manner and identifies that the vehicle 10 has completed the necessary 270° rotation at 36 based upon the data collected by either the first collection portion 16 or the second storage portion 18. In the illustrated example, the first collection portion 16 was purged and does not include any magnetic field data, so the processor module 20 checks the second collection portion 18. The second collection portion 18 began collecting magnetic field data at 40 and before the vehicle 10 rotated through any of the 270°. The processor module 20 then uses the magnetic field data from the second collection portion 18 to perform the calibration. The feature of utilizing the first collection portion 16 and the second collection portion 18 provides the benefit of reducing the period of time between calibrations compared to previously known compass assemblies. A previously known assembly would have purged the magnetic field data and therefore would have failed to identify the 270° rotation and perform a calibration attempt.

Figure 3:
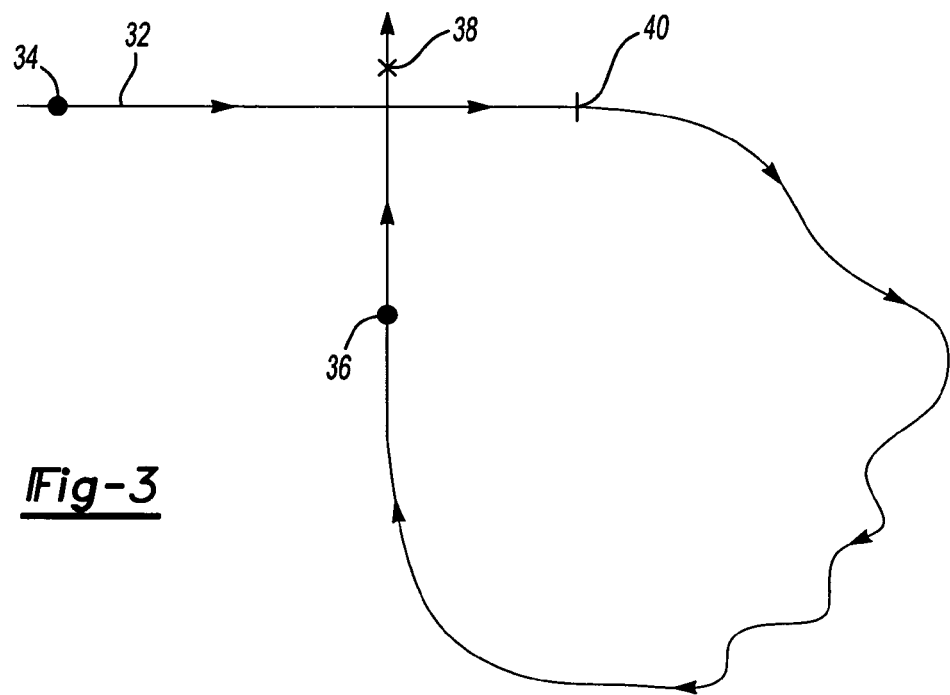
FIG. 3 schematically illustrates a second example method of calibrating an electronic compass.

In the example illustrated in FIG. 3, the 270° rotation at 36 is completed before the predetermined time limit occurs at 38. As a result, both the first collection portion 16 and the second collection portion 18 include magnetic field data through the 270° rotation. In this example, the processor module 20 uses the magnetic field data from the first collection portion 16, the magnetic field data 14 from the second collection portion 18, or both to perform the calibration. In one example, the processor module includes a default condition to use the magnetic field data from the first collection portion 16 if the first collection portion 16 includes magnetic field data through the 270° rotation.

Figure 4:
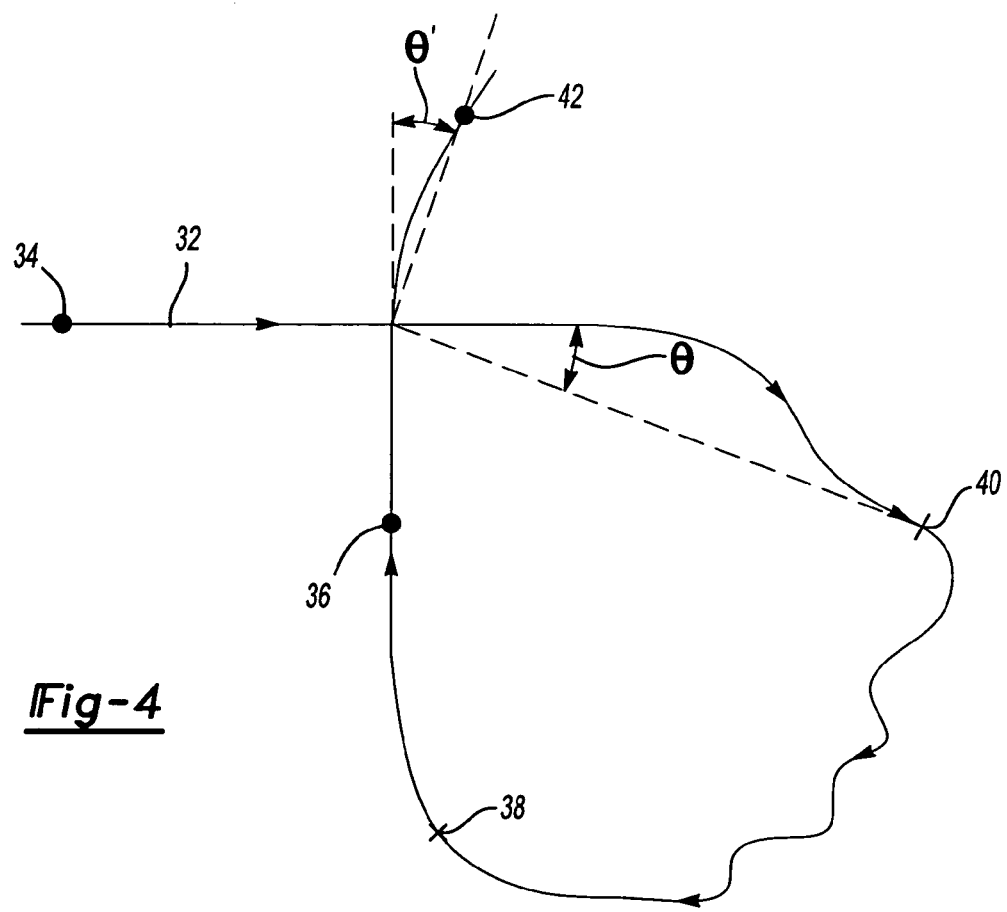
FIG. 4 schematically illustrates a third example method of calibrating an electronic compass.

In the example illustrated in FIG. 4, the first collection portion 16 begins collecting magnetic field data at 34. The predetermined time limit at 38 occurs before the expected 270° rotation at 36. In this example, the vehicle 10 has partially rotated an angle θ through the 270° rotation when the second collection portion 18 begins collecting magnetic field data at 40. At the expected completion of the 270° rotation at 36 for the first collection portion 16, the first collection portion 16 does not include magnetic field data through a complete 270° rotation because the processor module 20 purged the first collection portion 16 at 38 (as described above). The second collection portion 18 includes magnetic field data for a rotation of 270° minus the angle θ. As a result, the second collection portion 18 does not include magnetic field data through a full 270° rotation and the processor module 20 will not perform a calibration at 36.

In the illustrated example, the vehicle 10 continues to move beyond 36 and the second collection portion 18 continues to collect magnetic field data. The vehicle 10 rotates through an angle θ' at the point 42. The angle θ' is equal to θ, such that the second collection portion 18 includes magnetic field data through a full 270° at the point 42. The processor module 20 identifies in a known manner that the vehicle 10 has rotated 270° and uses the magnetic field data from the second collection portion 18 to perform the calibration provided that a second predetermined time limit for the second collection portion 18 is not exceeded.

In the disclosed examples, the calibration includes statistically fitting the magnetic field data stored within the second collection portion 18, the first collection portion 16, or both to produce a calibration output. The calibration output is in turn used to calculate compass headings for determining the vehicle directions, as is known.

For every 270° rotation of the vehicle 10, the processor module 20 determines a number of magnetic field data points collected for the first collection portion 16, second collection portion 18, or both and compares the number to a predetermined threshold number. If the number exceeds the predetermined threshold number, the processor module 20 proceeds to statistically fit the data to produce the calibration output. If the number is less than the threshold, the processor module 20 continues to collect magnetic field data.

In another example, the computed calibration output is either accepted or rejected based upon acceptance criteria to prevent the processor module 20 from using inaccurate and unreliable calibration outputs.

In one example, the acceptance criteria include normalizing relative to a mathematical feature of the calibration curve. In one example, the processor module determines a fitting error from the statistical fitting and then normalizes it relative to the mathematical feature of the calibration curve before determining whether to accept or reject the calibration output based upon an acceptance threshold. In another example, if the normalized fitting error is within a predetermined percentage of a length of the major axis of the calibration output (e.g., where the calibration output is elliptical), then the processor module 20 accepts the calibration output. In another example, the calibration output is circularized in a known manner and the radius or percent of the radius of the resulting circularized calibration output is compared to the normalized fitting error.

Normalizing the fitting error relative to the calibration output provides the benefit of taking a size of the calibration output into account in the acceptance criteria. If the absolute fitting error (i.e., not relative to the calibration output) were used instead and compared to an acceptance threshold, a large sized calibration output having a relatively small fitting error could be rejected even though the fitting error is not actually significant and a small sized calibration output having a relatively large fitting error could be accepted when the fitting error is actually significant.

Figure 5:
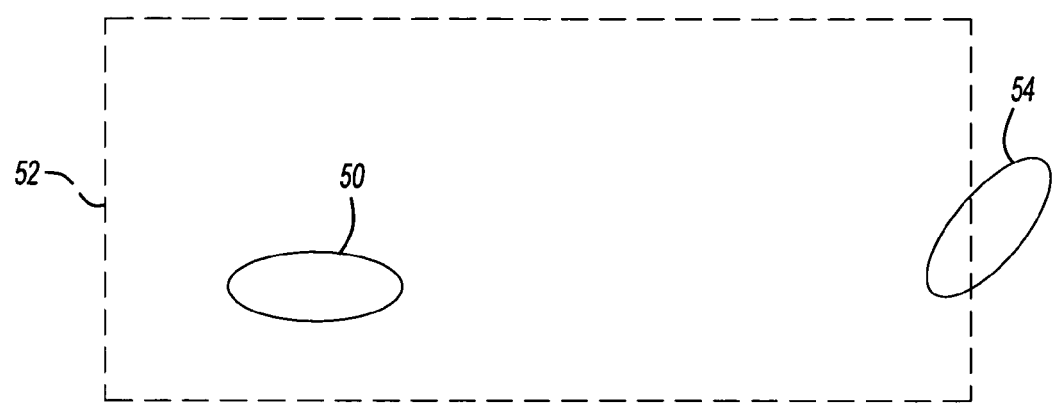
FIG. 5 schematically illustrates an example acceptance criterion for accepting or rejecting a calibration ellipse.

FIG. 5 schematically illustrates another example acceptance criterion. A calibration output 50 lies completely within a predetermined magnetic field sensor parameter 52. In this example, the processor module 20 accepts the calibration output 50 and proceeds to use the calibration output 50 to determine future compass headings. In another example, a calibration output 54 lies partially outside the predetermined magnetic field sensor parameter 52. In this example, the processor module 20 rejects the calibration output 54 and continues to use a prior calibration output for calculating future compass headings.

In one example, the predetermined magnetic field sensor parameter 52 corresponds to a physical capability of the magnetic field sensors 14. In one example, the predetermined magnetic field sensor parameter 52 corresponds to a maximum electrical output of the magnetic field sensors 14. A calibration output outside the maximum electrical output is not possible without an error or inaccuracy in the calculation of the calibration output. Therefore, the calibration output 54 is unreliable and is rejected.

Although a preferred embodiment of this invention has been disclosed, a worker of ordinary skill in this art would recognize that certain modifications would come within the scope of this invention. For that reason, the following claims should be studied to determine the true scope and content of this invention.

We claim:

1. A method of controlling an electronic compass comprising:
    calibrating an electronic compass based upon a magnetic field data set selected from a first magnetic field data set and a second, partially overlapping magnetic field data set having magnetic field data in common with the first magnetic field data set.

2. The method as recited in claim 1, including calibrating the electronic compass based upon the second, partially overlapping magnetic field data set if a predetermined time limit associated with the first magnetic field data set is exceeded.

3. The method as recited in claim 1, including statistically fitting at least one of the first magnetic field data set and the second magnetic field data set to produce a calibration output.

4. The method as recited in claim 3, including counting a number of magnetic field data points collected by at least one of the first magnetic field data or the second magnetic field data, and statistically fitting if the number exceeds a threshold number.

5. The method as recited in claim 3, including determining whether to accept or reject the calibration output based upon acceptance criteria.

6. The method as recited in claim 5, including determining the acceptance criteria based upon at least one of a magnetic field sensor parameter and a normalized statistical fitting error of the calibration output.

7. A method of calibrating an electronic compass comprising:
    collecting magnetic field data from a first magnetic field data set; and
    collecting partially overlapping magnetic field data from a second magnetic field data set; and calibrating an electronic compass based upon at least one of the magnetic field data or the partially overlapping magnetic field data.

8. A method as recited in claim 7, including collecting duplicate magnetic field data from an overlapping portion of two time periods and different magnetic field data from non-overlapping portions of the two time periods in each of the first magnetic field data set and the second magnetic field data set.

9. The method as recited in claim 7, including statistically fitting at least one of the first magnetic field data set or the second magnetic field data set to produce a calibration output.

10. The method as recited in claim 9, including determining a compass heading based upon the calibration output.

11. The method as recited in claim 9, including determining the calibration output based upon the first magnetic field data set if a first predetermined condition exists and determining the calibration based upon the second magnetic field data set if a second predetermined condition exists.

12. A method as recited in claim 11, including determining whether at least one of the first predetermined condition and the second predetermined condition exists based upon a predetermined time limit.

13. The method as recited in claim 12, including purging at least one of the first magnetic field data set or the second magnetic field data set based upon the predetermined time limit.

14. A compass assembly comprising:
    a first collection portion and a second collection portion that each collect magnetic field data, and the magnetic field data collected by the second collection portion partially overlaps the magnetic field data collected by the first collection portion; and
    a processor module that determines a calibration output based upon the magnetic field data from the first collection portion if a first predetermined condition exists and determines the calibration output based upon magnetic field data from the second collection portion if a second predetermined condition exists.

15. The assembly as recited in claim 14, wherein the magnetic field data is collected by the first collection portion over a first time period and the magnetic field data is collected by the second collection portion over a second time period different than the first time period.

16. The assembly as recited in claim 14, wherein the first predetermined condition includes being within a predetermined time limit.

17. The assembly as recited in claim 14, wherein the second predetermined condition includes exceeding a predetermined time limit.

18. The assembly as recited in claim 14, including a magnetic field sensing module that senses a magnetic field and produces output signals that correspond to the magnetic field data.

19. The assembly as recited in claim 14, including a compass display portion in communication with the processor module for displaying a vehicle direction based upon the calibration output.

* * * * *